Sept. 8, 1959     A. H. RZEPPA     2,902,844
UNIVERSAL JOINT
Filed June 24, 1957     2 Sheets-Sheet 1
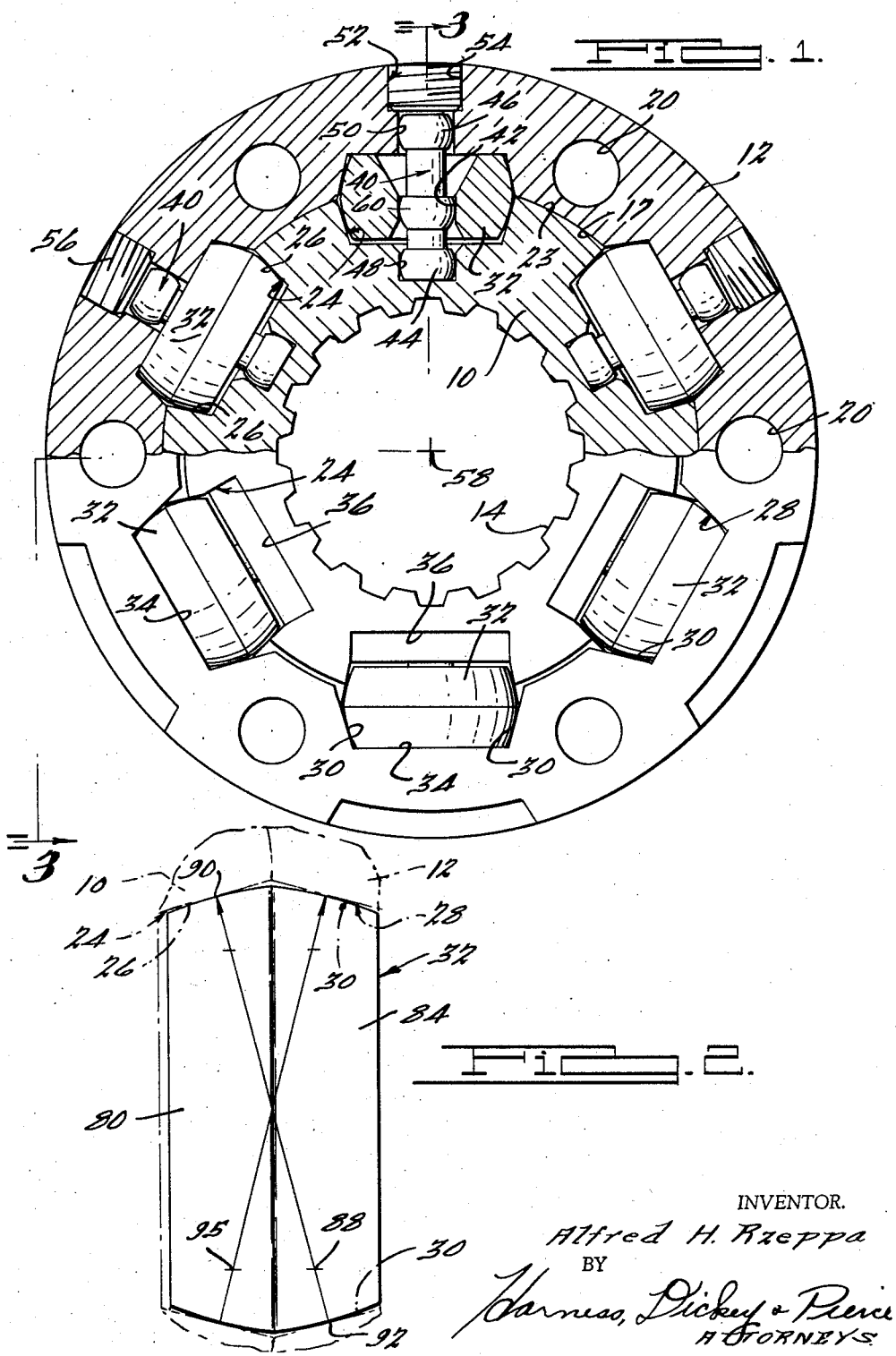
INVENTOR.
Alfred H. Rzeppa
BY
Harness, Dickey & Pierce
ATTORNEYS Sept. 8, 1959
A. H. RZEPPA
2,902,844
UNIVERSAL JOINT
Filed June 24, 1957
2 Sheets—Sheet 2
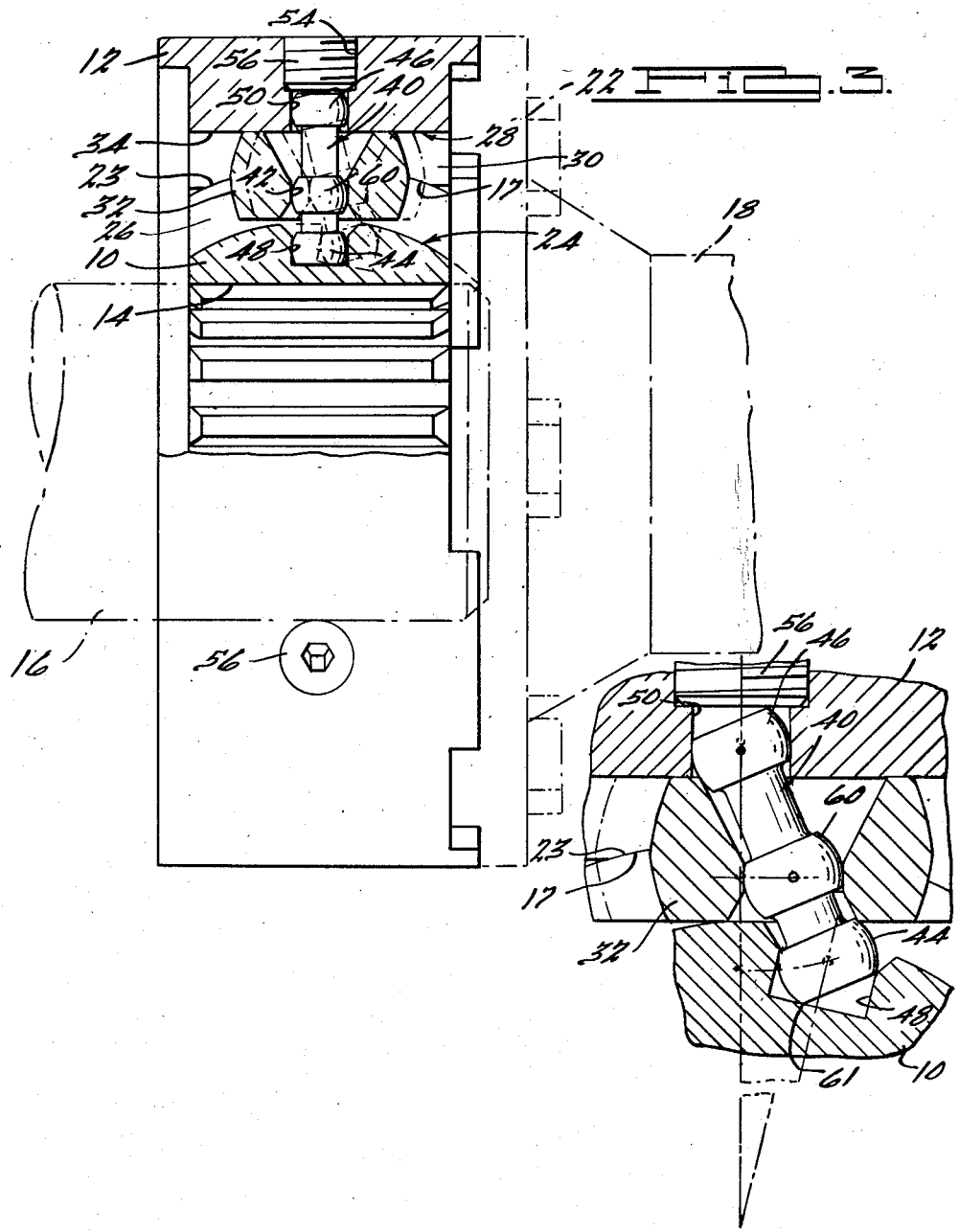
INVENTOR.
Alfred H. Rzeppa.
BY
Harness, Dickey & Pierce
ATTORNEYS.

United States Patent Office 2,902,844
Patented Sept. 8, 1959

2,902,844
UNIVERSAL JOINT
Alfred H. Rzeppa, Grosse Pointe, Mich.
Application June 24, 1957, Serial No. 667,353
11 Claims. (Cl. 64—21)

This invention relates to improved universal joints, and more particularly but not necessarily exclusively to improved universal joints of the so-called constant velocity type.

Previous constant velocity universal joints have comprised spherically engaged inner and outer members, or races coupled to each other by a series of balls engaging registering meridian grooves in the races. One important advantage of universal joints of this type is that the speed of rotation of the driven member always remains the same as the speed of rotation of the driving member regardless of the angular displacement between the two members. The sizes of universal joints of this type, made of a given material such as hardened alloy steel, are determined to a large extent by the power and torque they will be required to transmit in service.

The present invention pertains to a novel universal joint which may be of the constant velocity type and which is relatively compact and light weight, being smaller than previous constant velocity universal joints of the same power and torque transmitting capacity, or which if made of the same size as previous constant velocity universal joints is capable of transmitting substantially greater power and torque.

The capacity of previous universal joints of the type having spherically engaged inner and outer races coupled to each other by a series of balls such as shown, for example, in my previous Patents Nos. 1,665,280 and 2,046,584 is roughly proportional to the number of the coupling balls, the square of the diameter of the balls, and the spacing of the balls from the center of spherical curvature of the races. This approximate relationship may be expressed as follows:

$$\text{Capacity} = n \times d^2 \times r$$

where:
$n$ is the number of balls
$d$ is the diameter of the individual balls, and
$r$ is the distance from the center of spherical curvature of the races to the centers of the balls.

It will be seen that this relationship limits the capacity it is possible to build into one of these previous universal joints of a given over-all size.

Accordingly, one important object of the present invention is to provide an improved universal joint, particularly one of the constant velocity type.

Another object is to provide an improved universal joint of the constant velocity type having an improved capacity-to-size ratio.

These and other objects are accomplished by the instant invention which provides a universal joint having spherically engaging inner and outer races coupled together by a plurality of relatively short rollers. The rollers are of substantially smaller over-all size than the balls used to couple the members of previous constant velocity universal joints of similar capacity. These rollers are made relatively short in their axial dimension (radially with respect to the races) and of relatively great diameter, thus permitting a substantial reduction in the radius of the spherically engaging surfaces of the inner and outer races, and consequently a substantial reduction in the over-all size of the universal joint.

With reference to the approximate formula hereinabove described, the present invention achieves a substantial increase in the term $d$ and a corresponding decrease in the term $r$. Since the term $d$ is raised to its second power in the formula, the increase in $d$ over-shadows the decrease in $r$, thus simultaneously achieving an increase in capacity and a decrease in size. The effect is somewhat greater than would be expected from a simple inspection of the formula since the effective diameter of the rollers, which is the value of the term $d$ in the formula may be made substantially greater than their actual physical diameter.

The invention will now be described in greater detail in connection with the accompanying drawings of which:

Figure 1 is an elevational view partly in section of a universal joint according to a preferred embodiment of the invention;

Fig. 2 is a schematic elevational view of one of the coupling rollers of the universal joint shown in Fig. 1, particularly showing a preferred curvature of the roller surface;

Fig. 3 is a cross-sectional view partly in elevation of the universal joint shown in Fig. 1 taken along the section lines 3—3 thereof; and, Fig. 4 is a fragmentary cross-sectional view generally similar to the view of Fig. 3 but showing the universal joint with its inner and outer races angularly displaced from each other.

Although the practice of the present invention is not necessarily limited to universal joints of the constant velocity type, it is readily adaptable thereto, and in view of the well known advantages of the constant velocity characteristic, the invention will be described herein as embodied in a constant velocity universal joint. It will be apparent to those skilled in the art, however, that the principles of the invention can also be applied with advantage to universal joints of other types.

Referring now to the drawings, a constant velocity universal joint according to a preferred embodiment of the invention is shown therein and comprises a spherically curved inner race 10 fitted within an outer race 12, and having a bore 14 which may be splined as indicated to receive a shaft 16 for rotation therewith. The inner surface 17 of the outer race 12 is spherically curved to mate with the inner race 10, and the outer race 12 is provided with any convenient means for coupling it to a second shaft 18. Typically, the outer race may be externally splined, or as illustrated may be drilled and tapped for bolt attachment of a flanged terminal portion 22 of the shaft 18. The universal joint is bidirectional and can transmit torque from one of the shafts 16 or 18 to the other in either direction with equal efficiency and capacity.

The outer, spherically curved surface 23 of the inner race 10 is broken by a plurality of axially extending channel-like grooves 24 preferably having flat side walls 26, six such grooves being included in the present embodiment. The inner surface 17 of the outer race 12 is similarly broken by an equal number of axial grooves 28 in register with the grooves 24 of the inner race, and also including flat side walls 30. The precise disposition of the groove side walls 26 and 30 will be described in greater detail hereinafter in conjunction with the detailed description of the coupling rollers 32.

The inner and outer races 10 and 12, respectively, are drivingly coupled together by a plurality of relatively short rollers 32, which are fitted within the grooves 24 and 28 and bear against the side walls 26 and 30 thereof to transmit driving force between the races. They are slidable in the grooves 28 of the outer race 12, the flat axially extending floors 34 of the grooves 28 serving to restrain the rollers 32 against radially outward movement. The floors 36 of the inner race grooves 24 are relieved to permit angular displacement of the inner race 10 without binding the rollers 32 between the races. The relief of the floors 36 of the inner race grooves may comprise a simple cylindrical curvature about axes perpendicular to the principal axis of the inner race bore 14.

The rollers 32 are positively positioned by pilot pins 40 which extend through central bores 42 in the rollers. Each one of the pilot pins 40 includes spherically curved opposite end portions 44 and 46 fitted within cylindrical sockets 48 and 50 in the inner and outer races 10 and 12, respectively. The sockets 50 in the outer race 12 are formed as part of radial bores 52 opening upon the outer surface of the race 12 to permit ready insertion and removal of the pilot pins 40. The outer end portion 54 of the bore 52 may be threaded to receive a retaining screw 56, or may be otherwise adapted to prevent escape of the pin 40. The pilot pin retaining means such as the screws 56 are not firmly tightened against the pilot pins 40, but adequate clearance is left to permit pivoting of the pins 40 when the inner race 10 is angularly displaced from alignment with the outer race 12. The sockets 48 and 50 are all positioned and aligned upon axes passing through the center 58 of spherical curvature of the inner and outer races, each one of the sockets 48 and 50 being centrally disposed in one of the grooves 24 and 28, respectively.

Each one of the pilot pins 40 also includes a central spherically curved portion 60 which engages the bore 42 of the roller within which it is fitted. The bore 42 of each roller 32 is outwardly flared in both directions from the pin-engaging portion thereof to provide clearance for the pilot pin 40 when it is tilted with respect to the roller by angular displacement of the races 10 and 12 one from another.

The central curved portions 60 of the pilot pins are preferably located closer to the inner ends of the pins than to the outer ends thereof in order to drive the rollers to the proper positions during operation of the coupling for constant velocity characteristics. In the embodiment shown in the drawings, true constant velocity operation is achieved when the distance, taken on centers, between the outer portion 46 and the central portion 60 is about one and one-half times the distance from the inner portion 44 to the central portion 60.

As best shown in Fig. 4, the pilot pins reciprocate slightly as well as tilting when the two races are angularly displaced from each other. The outer end portions 46 move slightly inwardly and the inner end portions 44 move slightly outwardly, as controlled by the bearing of the annular corners 61 of the inner end portions 44 against the floors of the inner race sockets 48. The central portions 60 move in substantially straight paths.

For optimum operation of the universal joint, the shape of the rollers and the orientation of the groove side walls 26 and 30 are relatively critical. As heretofore explained, the groove side walls 26 and 30 are preferably straight and flat, although they may be curved if desired to increase their contact area with the rollers 32. The side walls 26 and 28 extend generally axially in the inner and outer races. They are oriented to meet and be tangent to the surfaces of the rollers 32 that they engage, and for optimum stress distribution within the rollers the points of tangency between the rollers and the respective side walls 26 and 30 are at the midpoints of the inner and outer halves of the rollers.

When the inner and outer races 10 and 12 are coaxially aligned, approximately half the length of each one of the rollers 32 is disposed within the inner race groove 24 and the other half lies in the outer race groove 28. Referring to Fig. 2, the left-hand portion 80 of the roller 32 as shown therein lies within the inner race groove 24, and the right-hand portion lies within the outer race groove 28. The side walls 26 of the inner groove are tangent to the left-hand portion 80 at its center 90, and the outer groove side walls 30 are tangent to the right-hand portion 84 at its center 92.

The left-hand portion 80 of the roller is axially curved about a center 88 lying on a line drawn between the point of tangency 90 of the left-hand portion 80 with the inner channel wall 26 and the diagonally opposite point of tangency 92 of the right-hand portion 84 of the roller with the outer channel wall 30. The right-hand portion 84 is curved about a center 95 taken on a line connecting the other two diagonally opposite points of tangency. The radius of curvature in each case may be substantially greater than the radius of the roller 32, thus providing a relatively large area contact between the roller and the groove wall.

Since the side walls 26 and 30 are tangent to the roller surfaces, it will be seen that when the inner and outer races 10 and 12 are coaxially aligned, the diagonally opposite ones of the side walls 25 and 30 of the inner and outer grooves, respectively, are parallel to each other and perpendicular to a line connecting their midpoints.

During operation of the universal joint, force is transmitted diagonally through the rollers 32 from one point of tangency, for example 92, to the diagonally opposite point of tangency 90, and the arrangement just described insures that the drive and reaction forces will be applied to the rollers 32 along the lines of force transmission, thus preventing the development of any forces tending to drive the rollers 32 in their axial direction, i.e., radially with respect to the races 10 and 12, which forces would tend to produce binding and to hinder free movement of the rollers 32 in the outer grooves 28.

With this construction, for a given power and torque handling capacity, a constant velocity universal joint may be made of substantially smaller size than previous constant velocity universal joints of the type coupled by balls. For purposes of computing the capacity of universal joints of the present invention according to the approximate formula hereinabove set forth the effective diameter of the rollers 32, that is, the value of the term $d$ lies somewhere between the full diameter of the rollers and twice the radius of axial curvature of the roller surfaces. Thus, a substantial increase in capacity is provided relative to the ball coupled type of universal joint, even though the over-all size of the universal joint is significantly reduced. At the same time, the pilot pins 40 positively position the coupling rollers 32 to maintain them always in a proper driving position for constant velocity operation. The rollers are positively positioned regardless of the displacement angle between the shafts 16 and 18, and due to the curvature of their bearing surfaces and the angular disposition of the side walls 26 and 30 of the grooves, binding forces are avoided and the rollers 32 are free to travel axially with respect to the outer race 12 with a minimum of frictional resistance.

What is claimed is:

1. Universal joint comprising an inner race having an axis of rotation and having a spherically curved outer surface, an outer race having an axis of rotation intersecting the axis of rotation of said inner race, said outer race being fitted upon said inner race and having a spherically curved inner surface in close fitting sliding engagement with said spherical surface of said inner race, said inner and outer races having a plurality of grooves formed in their adjacent surfaces extending parallel to their respective axes of rotation, the grooves of said inner and outer races being in register when said races are coaxially aligned one with another, and a plurality of relatively short generally barrel shaped rollers disposed in said grooves with their axes of rotation generally perpendicular to the axis of rotation of said outer race to couple said inner and outer races together.

2. Universal joint comprising an inner race adapted for rotation about an axis and having a spherically curved outer surface, an outer race adapted for rotation about an axis and having a spherically curved inner surface, said outer race being fitted upon said inner race in sliding engagement therewith, said spherically curved inner surface being broken by a plurality of axially extending grooves having inwardly diverging planar side walls, said outer spherical surface being broken by a plurality of axially extending grooves having substantially planar outwardly diverging side walls, said outer surface grooves being in register with said inner surface grooves when said inner and outer races are coaxially aligned, a plurality of relatively short rollers disposed one within each pair of said grooves with their axes generally perpendicular to the axis of said outer race, each one of said rollers engaging the side walls of a groove in said outer surface and a groove in said inner surface.

3. Universal joint comprising an inner race adapted for rotation about an axis and having a spherically curved outer surface, an outer race adapted for rotation about an axis and having a spherically curved inner surface, said outer race being fitted upon said inner race in sliding engagement therewith, said spherically curved inner surface being broken by a plurality of axially extending grooves having inwardly diverging planar side walls, said outer spherical surface being broken by a plurality of axially extending grooves having substantially planar outwardly diverging side walls, said outer surface grooves being in register with said inner surface grooves when said inner and outer races are coaxially aligned, a plurality of relatively short rollers disposed one within each pair of said grooves with their axes generally perpendicular to the axis of said outer race, each one of said rollers engaging the side walls of a groove in said outer surface and a groove in said inner surface, and means for driving said rollers along said inner surface grooves in response to angular displacement of said inner race from said outer race.

4. Universal joint comprising an inner race adapted for rotation about an axis and having a spherically curved outer surface, an outer race adapted for rotation about an axis and having a spherically curved inner surface, said outer race being fitted upon said inner race in sliding engagement therewith, said spherically curved inner surface being broken by a plurality of axially extending grooves having inwardly diverging planar side walls, said outer spherical surface being broken by a plurality of axially extending grooves having substantially planar outwardly diverging side walls, said outer surface grooves being in register with said inner surface grooves when said inner and outer races are coaxially aligned, a plurality of relatively short rollers disposed one within each pair of said grooves wtih their axes generally perpendicular to the axis of said outer race, each one of said rollers engaging the side walls of a groove in said outer surface and a groove in said inner surface, each one of said rollers being centrally bored, and a plurality of pilot pins extending from said outer race to said inner race through different respective ones of said rollers for driving said rollers axially with respect to said outer race in said outer grace grooves in response to angular displacement of said inner race with respect to said outer race.

5. Universal joint comprising an inner race adapted for rotation about an axis and having a spherically curved outer surface, an outer race adapted for rotation about an axis and having a spherically curved inner surface, said outer race being fitted upon said inner race in sliding engagement therewith, said spherically curved inner surface being broken by a plurality of axially extending grooves having inwardly diverging planar side walls, said outer spherical surface being broken by a plurality of axially extending grooves having substantially planar outwardly diverging side walls, said outer surface grooves being in register with said inner surface grooves when said inner and outer races are coaxially aligned, a plurality of relatively short rollers disposed one within each pair of said grooves with their axes generally perpendicular to the axis of said outer race, each one of said rollers engaging the side walls of a groove in said outer surface and a groove in said inner surface, each one of said rollers being centrally bored, and a plurality of pilot pins extending from said outer race to said inner race through different respective ones of said rollers for driving said rollers axially with respect to said outer race in said outer race grooves in response to angular displacement of said inner race with respect to said outer race, each one of said pilot pins having a spherically curved portion intermediate its ends in slidable engagement with the wall of said bore, said curved portions of said pins being positioned to drive the rollers in which they are fitted linearly in said outer race grooves in response to angular displacement of said inner race with respect to said outer race.

6. Universal joint comprising an inner race adapted for rotation about an axis and having a spherically curved outer surface, an outer race adapted for rotation about an axis and having a spherically curved inner surface, said outer race being fitted upon said inner race in sliding engagement therewith, said spherically curved inner surface being broken by a plurality of axially extending grooves having inwardly diverging planar side walls, said outer spherical surface being broken by a plurality of axially extending grooves having substantially planar outwardly diverging side walls, said outer surface grooves being in register with said inner surface grooves when said inner and outer races are coaxially aligned, a plurality of relatively short rollers disposed one within each pair of said grooves with their axes generally perpendicular to the axis of said outer race, each one of said rollers engaging the side walls of a groove in said outer surface and a groove in said inner surface, the circumferential surfaces of said rollers being of double convex curvature.

7. Universal joint comprising an inner race adapted for rotation about an axis and having a spherically curved outer surface, an outer race adapted for rotation about an axis and having a spherically curved inner surface, said outer race being fitted upon said inner race in sliding engagement therewith, said spherically curved inner surface being broken by a plurality of axially extending grooves having inwardly diverging planar side walls, said outer spherical surface being broken by a plurality of axially extending grooves having substantially planar outwardly diverging side walls, said outer surface grooves being in register with said inner surface grooves when said inner and outer races are coaxially aligned, a plurality of relatively short rollers disposed one within each pair of said grooves with their axes generally perpendicular to the axis of said outer race, each one of said rollers engaging the side walls of a groove in said outer surface and a groove in said inner surface, the circumferential surfaces of said rollers being of double convex curvature, each one of said rollers having inner and outer axially extending portions of substantially equal lengths, the side walls of said inner race grooves being tangent to said inner roller portions at the midpoints thereof, and the side walls of said outer race grooves being tangent to said outer roller portions at the midpoints of said outer roller portions.

8. Universal joint comprising an inner race adapted for rotation about an axis and having a spherically curved outer surface, an outer race adapted for rotation about an axis and having a spherically curved inner surface, said outer race being fitted upon said inner race in sliding engagement therewith, said spherically curved inner surface being broken by a plurality of axially extending grooves having inwardly diverging planar side walls, said outer spherical surface being broken by a plurality of axially extending grooves having substantially planar outwardly diverging side walls, said outer surface grooves being in register with said inner surface grooves when said inner and outer races are coaxially aligned, a plurality of relatively short rollers disposed one within each pair of said grooves with their axes generally perpendicular to the axis of said outer race, each one of said rollers engaging the side walls of a groove in said outer surface and a groove in said inner surface, the circumferential surfaces of said rollers being of double convex curvature, each one of said rollers having inner and outer portions of substantial equal lengths, the side walls of said inner race grooves being tangent to said inner roller portions at the midpoints thereof, and the side walls of said outer race grooves being tangent to said outer roller portions at the midpoint of said outer roller portions, the surfaces of said inner and outer roller portions being curved axially about a center of curvature lying on a line connecting diagonally opposite points of tangency between said rollers and said side walls.

9. Universal joint comprising an inner race adapted for rotation about an axis and having a spherically curved outer surface, an outer race adapted for rotation about an axis and having a spherically curved inner surface, said outer race being fitted upon said inner race in sliding engagement therewith, said sperically curved inner surface being broken by a plurality of axially extending grooves having inwardly diverging planar side walls, said outer spherical surface being broken by a plurality of axially extending grooves having substantially planar outwardly diverging side walls, said outer surface grooves being in register with said inner surface grooves when said inner and outer races are coaxially aligned, a plurality of relatively short rollers disposed one within each pair of said grooves with their axes generally perpendicular to the axis of said outer race, each one of said rollers engaging the side walls of a groove in said outer surface and a groove in said inner surface, and means to position said rollers to maintain their centers in a common plane regardless of the angular displacement of said inner race with respect to said outer race, said common plane substantially bisecting the angle between the planes of rotation of said inner and outer races, said positioning means including a plurality of pilot pins loosely supported between said inner and outer races, each one of said pins extending through a central bore in a different one of said rollers and including spherically curved opopsite end portions, said inner and outer races defining sockets shaped to receive said end portions and disposed centrally in said grooves, said pilot pins being loosely held for free pivoting action between said races with said spherical end portions disposed within opposing ones of said sockets, each one of said pilot pins also including a spherically curved portion intermediate between said opposite end portions and in slidable engagement with the roller in which it is mounted.

10. Universal joint comprising an inner race adapted for rotation about an axis and having a spherically curved outer surface, the center of curvature of said surface lying on said axis of an outer race fitted upon said inner race in sliding engagement therewith and having a spherically curved inner surface substantially conforming to said outer surface of said inner race, the inner surface of said outer race being broken by a plurality of axially extending grooves having inwardly diverging planar side walls, the outer surface of said inner race being broken by a like number of axially extending grooves having substantially planar outwardly diverging side walls, said outer surface grooves being in register with said inner surface grooves when said inner and outer races are coaxially aligned, a plurality of rollers disposed one within each pair of said grooves with their axes generally perpendicular to the axis of said outer race, the lengths of said rollers being shorter than the diameters thereof, each one of said rollers having an outer portion in engagement with the side walls of a groove in said outer surface and an inner portion engaging the side walls of a groove in said inner surface, the circumferential surfaces of said rollers being of double convex curvature, the surfaces of said inner and outer portions being curved in the plane of the axis of said rollers about a center disposed along a line connecting diagonally opposite points of engagement of said roller with said inner and outer groove side walls.

11. Universal joint comprising an inner race having a spherically curved outer surface, an outer race fitted upon said inner race and having a spherically curved inner surface in close fitting sliding engagement with said spherical surface of said inner race, said inner and outer races having a plurality of axially extending grooves formed in their adjacent surfaces in register one with another, and a plurality of relatively short generally barrel shaped rollers disposed in said grooves to couple said inner and outer races together, each one of said rollers having two opposite end portions which are curved about mutually different centers in the plane of the major axis of the roller.

References Cited in the file of this patent

UNITED STATES PATENTS

| | | |
|---|---|---|
| 2,033,583 | McCarrell | Mar. 10, 1936 |
| 2,147,491 | Lebus | Feb. 14, 1939 |
| 2,313,279 | Suczek | Mar. 9, 1943 |
| 2,802,352 | Anderson | Aug. 13, 1957 |